US008255489B2

(12) United States Patent
Afergan et al.

(10) Patent No.: US 8,255,489 B2
(45) Date of Patent: Aug. 28, 2012

(54) METHOD OF DATA COLLECTION AMONG PARTICIPATING CONTENT PROVIDERS IN A DISTRIBUTED NETWORK

(75) Inventors: Michael M. Afergan, Cambridge, MA (US); F. Thomson Leighton, Newtonville, MA (US); Timothy P. Johnson, Boston, MA (US); Brian J. Mancuso, Cambridge, MA (US); Ken G. Iwamoto, Bolton, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 205 days.

(21) Appl. No.: 11/840,979

(22) Filed: Aug. 19, 2007

(65) Prior Publication Data

US 2008/0092058 A1 Apr. 17, 2008

Related U.S. Application Data

(60) Provisional application No. 60/838,610, filed on Aug. 18, 2006, provisional application No. 60/838,735, filed on Aug. 18, 2006.

(51) Int. Cl.
G06F 15/16 (2006.01)

(52) U.S. Cl. ........................................ 709/219; 709/206

(58) Field of Classification Search .................. 709/206, 709/219, 224, 240
See application file for complete search history.

(56) References Cited

U.S. PATENT DOCUMENTS

| | | | |
|---|---|---|---|
| 5,991,809 A | 11/1999 | Kriegsman et al. | |
| 6,003,030 A | 12/1999 | Kenner et al. | |
| 6,073,241 A | 6/2000 | Rosenberg et al. | |
| 6,108,703 A | 8/2000 | Leighton et al. | |
| 6,185,598 B1 | 2/2001 | Farber et al. | |
| 6,256,675 B1 | 7/2001 | Rabinovich et al. | |
| 6,405,252 B1 | 6/2002 | Gupta et al. | |
| 6,574,609 B1 * | 6/2003 | Downs et al. | 705/50 |
| 6,996,616 B1 | 2/2006 | Leighton et al. | |
| 7,107,619 B2 | 9/2006 | Silverman | |
| 7,240,100 B1 * | 7/2007 | Wein et al. | 709/214 |
| 7,356,590 B2 | 4/2008 | Wilson et al. | |

(Continued)

OTHER PUBLICATIONS

Yee, "A survey of Cookie Management Functionality and Usability in Web browsers," http://zesty.ca/2002/priv/cookie-survey.pdf, 2002.

(Continued)

*Primary Examiner* — Kenny Lin
*Assistant Examiner* — Gerald Smarth
(74) *Attorney, Agent, or Firm* — David H. Judson

(57) ABSTRACT

A content delivery network (CDN) service provider extends a content delivery network to gather information on atomically identifiable web clients (called "user agents") as such computer-implemented entities interact with the CDN across different domains being managed by the CDN service provider. In one embodiment, a set of machines, processes, programs, and data comprise a data system. The data system tracks user agents, preferably via cookies, although one or more passive techniques may be used. A user agent may be a cookie-able device having a cookie store. As the user agent navigates across sites, a CDN-specific unique identifier used by the system to correlate user agents is generated. Preferably, the unique identifier is stored as an encrypted cookie. The unique identifier represents one user agent (and, thus, one cookie-able device's store). The system tracks user agent behavior on and across customer sites that are served by the CDN, and these behaviors are classified into identifiable "segments" that may be used to create a profile. CDN customers use the data system to obtain information that characterizes the user agent.

9 Claims, 6 Drawing Sheets

U.S. PATENT DOCUMENTS

| | | | |
|---|---|---|---|
| 7,386,512 B1 * | 6/2008 | Allibhoy et al. | 705/51 |
| 7,415,423 B2 | 8/2008 | Ranka et al. | |
| 7,630,986 B1 * | 12/2009 | Herz et al. | 1/1 |
| 2002/0007317 A1 | 1/2002 | Callaghan et al. | |
| 2002/0143798 A1 | 10/2002 | Lisiecki et al. | |
| 2002/0165955 A1 * | 11/2002 | Johnson et al. | 709/224 |
| 2003/0028451 A1 | 2/2003 | Ananian | |
| 2003/0216961 A1 * | 11/2003 | Barry | 705/14 |
| 2004/0168184 A1 * | 8/2004 | Steenkamp et al. | 725/31 |
| 2005/0144064 A1 | 6/2005 | Calabria et al. | |
| 2005/0177401 A1 * | 8/2005 | Koeppel et al. | 705/4 |
| 2005/0277473 A1 * | 12/2005 | Barry | 463/42 |
| 2006/0080321 A1 * | 4/2006 | Horn et al. | 707/10 |
| 2006/0206709 A1 | 9/2006 | Labrou et al. | |
| 2007/0033102 A1 | 2/2007 | Frank et al. | |
| 2007/0220010 A1 | 9/2007 | Ertugrul | |
| 2007/0255821 A1 | 11/2007 | Ge et al. | |
| 2007/0276944 A1 | 11/2007 | Samovar et al. | |
| 2008/0015929 A1 * | 1/2008 | Koeppel et al. | 705/10 |
| 2008/0201266 A1 * | 8/2008 | Chua et al. | 705/67 |

OTHER PUBLICATIONS

U.S. Appl. No. 11/840,839, Office action mailed Jan. 26, 2010.

U.S. Appl. No. 11/840,841, Office action mailed Sep. 29, 2010.

* cited by examiner

As such a sample profile might be as follows:

USER ID = 326
Sports = 0.8
    General Pro (vs College) = 0.8
    Pro Baseball=0.8
    College Baseball=0.3
    Pro Football=0.7
    College Football=0.5
    Hockey=0.1
    Soccer=0.4
    Teams= Patriots, Celtics, Bruins, BC, Harvard
News=0.7
    International=0.8
    National=0.7
    Nation=US
    Regional=0.6
    Region=Massachusetts
Entertainment=0.3
    Movies=0.6
    Music=0.5
    People=Bono
Finance=0.7

Auto=0.6
Home Appliance=0.3
Travel=0.8
Travel Location=Korea

Age-Below-10: 0.01
Age-11-17: 0.01
Age-18-25: 0.1
Age-25-40: 0.3
Age-40-60: 0.4
Age-60+: 0.18
Male=0.8
Income-Below-30K=0.2
Income-30K-80K=0.6
Income-80K+=0.2
Home=02848
Work=02142

Internet-Time-per-Day=4 hours
Internet-Shopping-Level=0.8

*FIG. 7*

METHOD OF DATA COLLECTION AMONG PARTICIPATING CONTENT PROVIDERS IN A DISTRIBUTED NETWORK

This application is based on and claims priority to Ser. No. 60/838,610, filed Aug. 18, 2006, and Ser. No. 60/838,735, filed Aug. 18, 2006.

CROSS-REFERENCE TO RELATED APPLICATIONS

This application is related to the following applications:

Ser. No. 11/840,838, filed Aug. 17, 2007, titled "Method and system for data collection in a distributed network."

Ser. No. 11/840,839, filed Aug. 17, 2007, titled "Method and system for identifying valid users operating across a distributed network."

Ser. No. 11/840,841, filed Aug. 17, 2007, titled "Method and system for mitigating automated agents operating across a distributed network."

BACKGROUND OF THE INVENTION

1. Technical Field

The present invention relates generally to data collection in distributed networks.

2. Brief Description of the Related Art

Distributed computer systems are well-known in the prior art. One such distributed computer system is a "content delivery network" or "CDN" that is operated and managed by a service provider. The service provider typically provides the service on behalf of third parties. A "distributed system" of this type typically refers to a collection of autonomous computers linked by a network or networks, together with the software, systems, protocols and techniques designed to facilitate various services, such as content delivery or the support of outsourced site infrastructure. Typically, "content delivery" means the storage, caching, or transmission of content, streaming media and applications on behalf of content providers, including ancillary technologies used therewith including, without limitation, DNS request handling, provisioning, data monitoring and reporting, content targeting, personalization, and business intelligence. The term "outsourced site infrastructure" means the distributed systems and associated technologies that enable an entity to operate and/or manage a third party's Web site infrastructure, in whole or in part, on the third party's behalf.

Web servers deliver web-based content to Web browsers over the protocol known as HTTP. Because HTTP is a stateless protocol, a known HTTP protocol extension enables a Web server to provide state information to a requesting end user Web browser. In particular, a Web server may include in its reply a header that instructs the client to remember a small piece of state information (a "cookie"), and to include a copy of that information in future requests to the server. In this way, the Web server can track whether it has seen the client browser previously, and this tracking information can be used to build a browser-specific profile that may then be used to inform some other control function, e.g., what type of advertisement to serve within a web page that will be delivered to the browser. According to convention and practice, Web servers set cookies with values only within their own domain, which ensures that cookies are only sent back to the same web domain from which they came. This convention notwithstanding, there have been efforts to share cookies across content domains so that content preferences and interests associated with the individual using the Web browser can be identified. Thus, for example, in U.S. Pat. No. 6,073,241, a set of cooperating servers share cookie information via a shared database. In U.S. Patent Application No. 20020007317, client state information is placed in one or more cookies that are then shared across disjoint domains in a virtual shopping mall environment. The servers are non-cooperating, and an intermediary application is used to add state information to client requests and responses.

It is also known that ad serving companies have the capability to and do collect and correlate cookie data reflecting that a given Web browser has visited unaffiliated sites on which the company's ads have been served. The ad serving company can then use this data to build an end user profile.

BRIEF SUMMARY OF THE INVENTION

The present invention describes how a content delivery network (CDN) service provider extends a content delivery network to gather specific information on atomically identifiable web clients (called "user agents") as such entities interact with the CDN across different domains being managed by the CDN service provider. In one embodiment, a set of machines, processes, programs, and data comprise a data system. The system tracks user agents, preferably via cookies, although one or more passive techniques may be used. In a typical implementation, a user agent is a cookie-able device having a cookie store. As the user agent navigates across sites, a CDN-specific unique identifier (a Master ID) used by the system to correlate user agents is generated. Preferably, the unique identifier is stored as an encrypted cookie. The Master ID always represents one user agent (and, thus, one cookie-able device's store), but this does not mean it is one "user," and it does not guarantee that the user agent is associated with a human user. The system tracks user agent behavior on and across customer sites that are served by the CDN, and these behaviors are classified into identifiable "segments." A "behavior" is an event that a user agent (as identified by its Master ID) makes on a site. Typically, a behavior is associated with a request made by the user agent. A "segment" is a calculated classification of user agent's behavior, typically generated by an algorithm that incorporates one or more behaviors. A segment is a collection of one or more behaviors using one or more methods. A "user profile" is a set of one or more segments.

A first use case is a "publisher" service. In this example, a given CDN customer that operates a set of domains or properties (using the CDN) may use the system to obtain information about the user agents that operate across that set of domains. Such information may then be used by the customer (or others) for other purposes (e.g., ad serving, dynamic content generation, or the like).

A second use case is a "bot mitigation" service. In this example, a given CDN customer that operates a transactional site (e.g., a web site at which end users purchase limited inventory items, such as event tickets, hotel rooms, airline seats, and the like) may use the system to obtain information about the user agents that access the site and, in particular, whether a particular user agent is likely to be an automated entity (e.g., a software robot or "bot"). The site can use this information to offer the best level of service to those user agents most likely to be valid (i.e., human). This operation facilitates mitigation of bot and other site frauds.

A third use case is a "partner" service. In this example, the CDN service provider uses the data system to provide federated services on behalf of two or more entities that use the CDN. As an example, Customer A is a product manufacturer; Customer B is a web site that provides information services about new and used products. Customers A and B have (or may benefit from) a business relationship under which they share information about the end users who visit their respective web sites. In this example, if both Customer A and Customer B use the CDN to deliver their sites, the data system herein may be used by one or both customers to facilitate and extend such data sharing, as the CDN can use the data system to collect the behavior information of user agents who visit both sites.

Another use case is a "targeting" service. In this example, the CDN service provider uses the data system to facilitate targeting of advertisements, e.g., by generating a user profile of a user agent and providing that profile to an ad serving engine.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 7 illustrates a representative user profile that includes a set of segments.

DETAILED DESCRIPTION OF AN ILLUSTRATIVE EMBODIMENT

Figure 1:
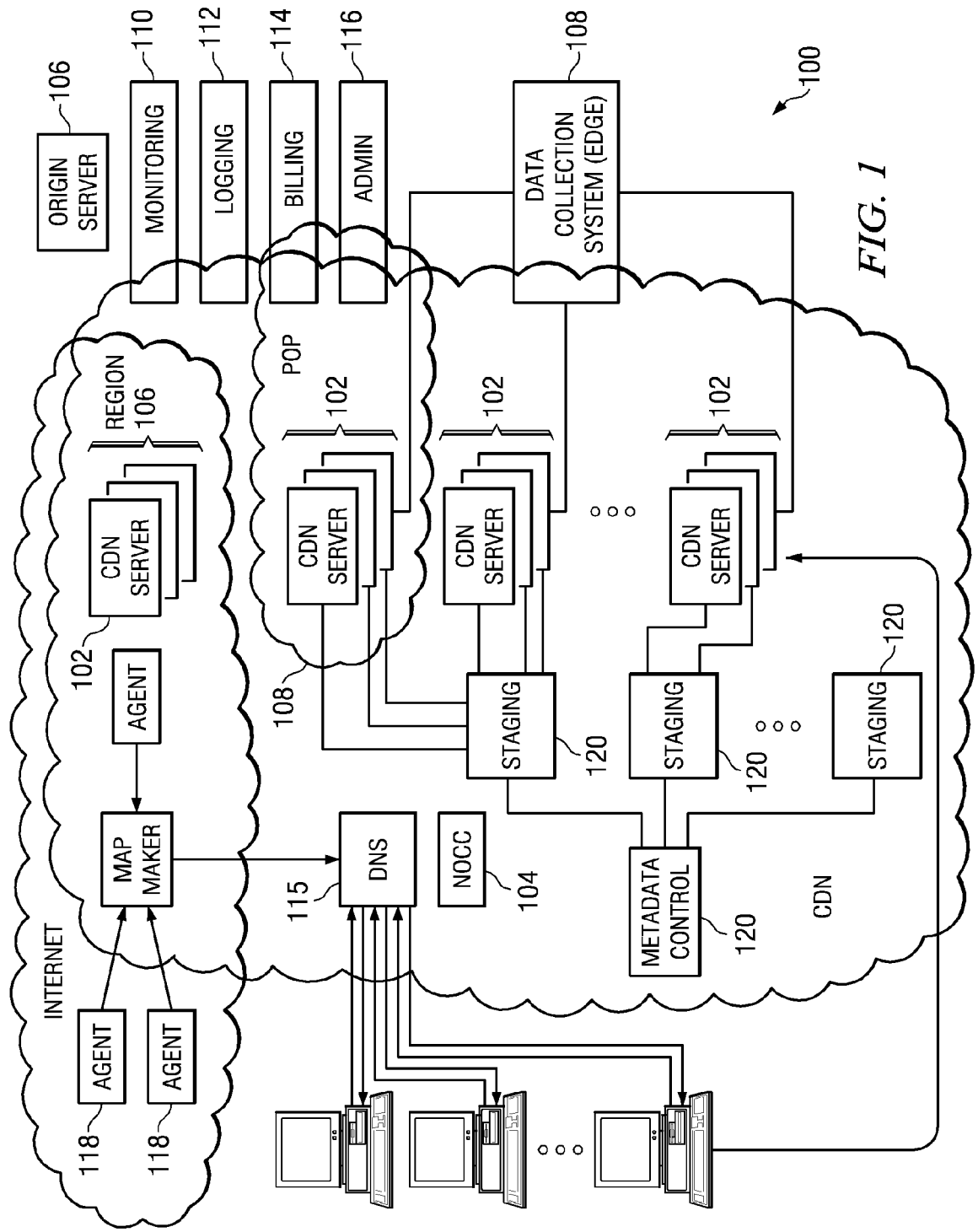
FIG. 1 is a representative content delivery network in which the subject matter herein may be implemented.
Figure 2:
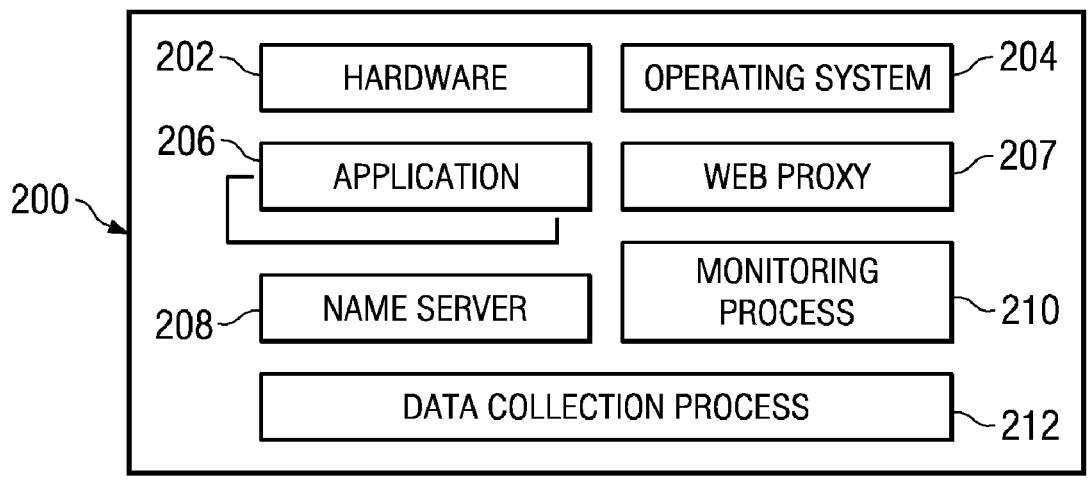
FIG. 2 is a representative edge server of the content delivery network of FIG. 1.

The subject matter described herein may be implemented in a content delivery network, such as illustrated in FIGS. 1 and 2. Use in a CDN is a not a limitation, however, as the subject matter may be implemented in any environment in which one entity operates a distributed network from which third party content is distributed.

In a representative embodiment, a distributed computer system 100 is configured as a CDN and is assumed to have a set of machines 102a-n distributed around the Internet. Typically, most of the machines are servers located near the edge of the Internet, i.e., at or adjacent end user access networks. A Network Operations Command Center (NOCC) 104 may be used to administer and manage operations of the various machines in the system. Third party sites, such as Web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire such content may be directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers. As illustrated in FIG. 2, a given machine 200 comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP Web proxy 207, a name server 208, a local monitoring process 210, a distributed data collection process 212, and the like. The Web proxy 207 typically includes or has associated therewith an edge server manager process to facilitate one or more functions associated with the content delivery network.

A CDN edge server such as shown in FIG. 2 is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the distributed data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server. Then, when an edge server manager process (g-host) receives a request for content, it searches an index file for a match on a customer hostname associated with the request. If there is no match, the edge server process rejects the request. If there is a match, the edge server process loads metadata from the configuration file to determine how it will handle the request. That handling process is described in U.S. Pat. No. 7,240,100.

Figure 3:
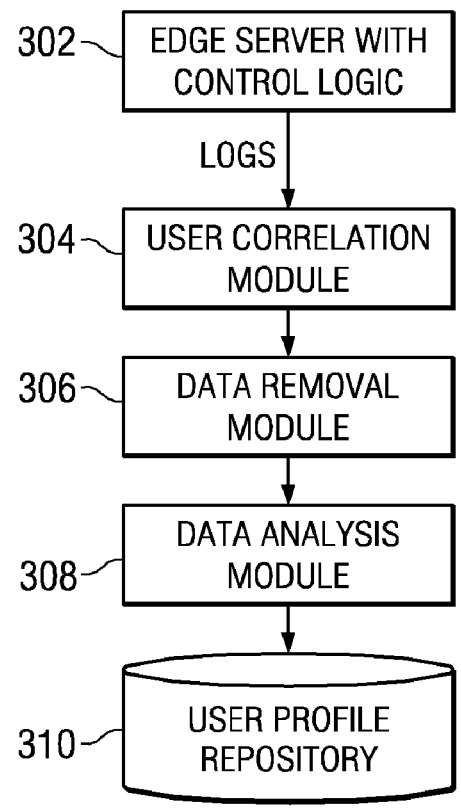
FIG. 3 represents a high level view of a online behavior data collection architecture for use in the content delivery network.

A CDN such as described above may be extended according to the subject matter described herein using an online behavior data collection system such as shown generally in FIG. 3. In this example, it is assumed that a given edge server machine (such as shown in FIG. 2) has been extended to include a given data collection routine 302, and that the CDN includes a cluster (described below) that receives, processes, manages and stores client machine user agent behavior data received from the edge servers. A representative embodiment is implemented within or in conjunction with a content delivery network, although this is not a limitation. The cluster includes the following abstract functions: user correlation module 304, data removal module 306, and data analysis module 308. Resulting data is stored in repository 310.

The above modules are explained below.

Terminology

The following terminology is used in the context of the subject matter described herein.

Content Domain—A domain of a Content Provider.

Content Provider (CP)—A web site provider, assumed to be a CDN customer.

Cross-Domain Service—A service that sets per-user cookies on a particular domain, e.g., by embedding objects in different websites. For example, an advertiser who serves images off of one domain but within web pages of many different content providers. The cookies set by these objects are often referred to as "third-party cookies." For the purpose of this document, a Cross-Domain service also is assumed to be CDN customer, regardless of the relationship (if any) that the CDN service provider has with the content provider whose web site within which the Cross-Domain Service's objects are embedded.

Content Provider Cookie—A cookie set by a Content Provider in a particular domain to track a user agent.

Content Provider ID—a unique ID assigned to a user by a content provider, or a CPID Master ID—A unique ID assigned to a user across the system.

Master Domain—The domain used to correlate a user's different domain IDs in an active approach, as described below.

Domain ID Cookie—A cookie set by the CDN service provider in the namespace of a Content Domain containing the Master ID.

Master ID Cookie—The cookie set in the Master Domain containing the Master ID.

User Agent—An atomically identifiable web client. In most cases, this will correspond to a particular machine's browser. Typically, a user agent is instantiated when a web browser is opened on a client machine. If different browser types are opened on the same machine (e.g., one IE browser, and one FireFox browser), there are two user agents. Although not meant to be limiting, a user agent typically is associated with a cookie-able data store (i.e., a data store in which cookies are capable of being persisted). As used herein, a "user agent" need not be limited to a browser or a browser plug-in; the user agent may be an out-of-browser application, a process, a thread, or any other program. As will be seen below, the system has the capability of characterizing a given user agent as being associated with either a human user (or, more generally, an "acceptable user"), on the one hand, or an automated agent (e.g., a bot, or more generally, an "unacceptable user"), on the other. An automated agent thus may be thought of as any activity that is not human activity. The ability to characterize a user agent as associated with a human versus an automated agent provides a significant advantage, in that it enables the CDN service provider to provide a customer with a prediction about the nature of the user agent that is then making a request for some service at the customer's site. As will be described, typically this prediction is a function of the user agent's activity on other CDN domains (including, potentially, domains associated with other CDN customers). The prediction may be in the form of a valid user score (VUS) that represents a confidence value. The VUS may be represented as a number, a percentage, a code, or in any other convenient symbol, character or representation. In a typical use case, the user agent makes a request to the customer site; the system provides the content provider with a VUS that indicates the service provider's confidence that the user agent is associated with a human user or an automated agent; the customer then takes a given action in response to the prediction. The VUS may represent more than just two categories (i.e., a human or a bot); alternatively, there may be two or more "buckets" associated with a VUS (or its equivalent) so that more fine-grained predictions about the client machine user agent can be provided.

User Correlation Module

Preferably, the present invention tracks Users Agents within and between sites (or CDN domains) using one of two methods, an active method, or a passive method. The user correlation module 304 is used for this purpose.

The active method may work as follows:
1. Upon requesting an object in the Content Domain, check if the user has presented a Domain ID Cookie. If so, this user has already been identified, therefore take no further action. If not, redirect the user to the Master Domain to acquire the Master ID.
2. If the User does not present a Master ID cookie, generate a new unique ID and set the Master ID cookie it in the Master Domain. If the user does present a Master ID cookie, decrypt the ID, validate it, and if valid, re-encrypt it to be set in the Content Domain as a Domain ID cookie.
3. Redirect the User back to the Content Domain with a specific URL such that the Master ID can now be set as a Domain ID Cookie within the domain's namespace.

For example:
1. Assume that the User has never visited any Web site using this service. The User opens his or her Web browser to www.xyz.com. The browser does not present the Domain ID cookie in the www.xyz.com namespace, when it requests http://www.xyz.com/foo.gif, so the browser is redirected to, e.g., www.abmr.net/setID?www.xyz.com/foo.gif.
2. The User does not present a Master ID Cookie The Master Cookie (e.g., 26) is set as a cookie in the www.abmr.net namespace.
3. The browser is then redirected back to www.xyz.com/foo.gif? Master ID=26, which serves foo.gif and also sets the Domain ID Cookie in the www.xyz.com namespace.

For tracking and billing purposes, the CDN logs the Domain ID Cookie and/or the Master ID Cookie, preferably with every log line written by an edge server. The edge server logs are then processed by the user correlation module, as described below.

The passive method may work as follows:
1. Have the edge server record (in a log line) if a Per-Domain User ID Cookies is served with an object.
2. Have the edge server record (in a log line) if a Cross-Domain User Cookie is served with an object.

Note that separating the User Cookies from the other cookies may require some offline processing to understand what name/value pair corresponds to "username=ID" for the particular domain. The CDN service provider may separate out the User Cookies in real-time, or it may choose to log all cookies and then separate these out in some offline processing. Furthermore, if usage patterns suggest that a cross-domain user cookie was served to the same user as a per-domain user ID cookie, the CDN service provider may record the cross-domain user cookie in the log line corresponding to the per-domain user ID cookie, and vice versa.

At this point, for each per-domain user ID cookie there is (a) a set of recorded actions and (b) a set of associated Cross-Domain User ID Cookies seen while serving objects in that particular domain.

To create a complete picture of a user's actions across the CDN, the service provider may then perform the following:

i. Create two lists: Domain_Cookies (DC) and Cross_Domain_Cookies (CDC). Initially, seed the DC list with an arbitrary Per-Domain User-ID Cookie seen.
ii. For all cookies in the DC list, add all associated Cross-Domain User ID Cookies to the CDC list.
iii. For all cookies in the CDC list, add all associated Per-Domain User ID Cookies to the DC list.
iv. Repeat steps (ii) and (iii) until neither the DC nor the CDC list changes.

One or more other passive identification schemes do not rely upon cookies. A convenient technique is to encode information in HTTP headers. Several variants are now described.

A first scheme encodes the Master ID in an Etag field, which were introduced in the HTTP 1.1 specification. According to the specification, if a server specifies an Etag value when serving an object, a client that caches the object will specify that Etag value when requesting the object with an HTTP GET or HEAD method. Thus, one passive identification scheme works as follows. Assume a first time user requests an object from a given content provider domain, e.g., test.com, and is directed to a CDN edge server. The edge server that handles the request generates a new Master ID. The edge server serves the object, specifying the Master ID in the Etag field of a HTTP 200 OK response. When the browser next visits the site (and requests the same object), it is recognized by the Etag header that is specified in the GET or HEAD request.

In a variant, the Master ID is encoded as a date. Here, assume the first time user requests an object from test.com and is directed to a CDN edge server. The edge server generates a new Master ID, e.g., 305. The edge server then encodes the Master ID as a date, e.g., interpreting the Master ID to be the number of seconds that have elapsed since the start of a given time. Thus, for the Unix epoch, the encoded date would be 1 Jan. 1970 00:05:05. When the edge server serves the object, the encoded Master ID is then specified in the Date field of the HTTP 200 OK response. When the browser next visits the site (and requests the same object), it is recognized by the Last-modified header that is specified in the HTTP GET or HEAD request. The Date specified in this request is then decoded to obtain the Master ID.

In another variant, the Master ID is encoded in a Content-MD5 header, which was also introduced in the HTTP 1.1 specification. Here, assume the first time user requests an object from test.com and is directed to a CDN edge server. The edge server generates a new Master ID and encodes the identifier as an MD5 hash (e.g., by executing an MD5 hash function on the Master ID). The edge server then serves the object, specifying the Master ID in a Content-MD5 field of the HTTP 200 OK response. When the browser next visits the site (and requests the same object), it is recognized by the Content-MD5 header that it specified in the HTTP GET or HEAD request.

Of course, the above are merely illustrative examples of using a given HTTP header field to transport a Master ID or other information to facilitate the data collection methods of the present invention. This technique is also referred to as "overloading" a given HTTP header as the information included in the given header field is not the data that is otherwise expected in that field. Other techniques for passing the Master ID (such as embedding the identifier in an URL) may also be used.

Typically, the active and/or passive techniques are used on given CDN content domains. Preferably, however, neither the active nor passive techniques are used on certain sites, as determined by the provider or the CDN customer, or both.

Data Correction and Transformation

The data analysis module 308 takes as input a series of data units corresponding to a user's interaction with the CDN. Each unit may contain, for example:
A user machine's Internet Protocol (IP) address
The user's Domain ID/Master ID
The URL requested (including query string and POSTed values)
The referring URL for the requested object (if available)
Time of the request
All cookies associated with the request, including but not limited to:
  Cookies set by the content provider
  Per-Domain User ID Cookies
  Cross-Domain User ID Cookies
All data returned to the user associated with the request
Preferably, these units are provided together, such that the system can see what the user did over time.

As a first processing step, preferably the data is passed through a Data Removal Module 306. This module will remove:
Any personally identifiable information (PII):
  The user's name
  Address and telephone numbers
  Credit card information
  Social security number,
  Other The module then builds and/or augments a profile associated with the Master ID. As an alternative to filtering PII, the system may simply extract out non-PII.

CDN Cluster and Edge Service Implementation

Figure 4:
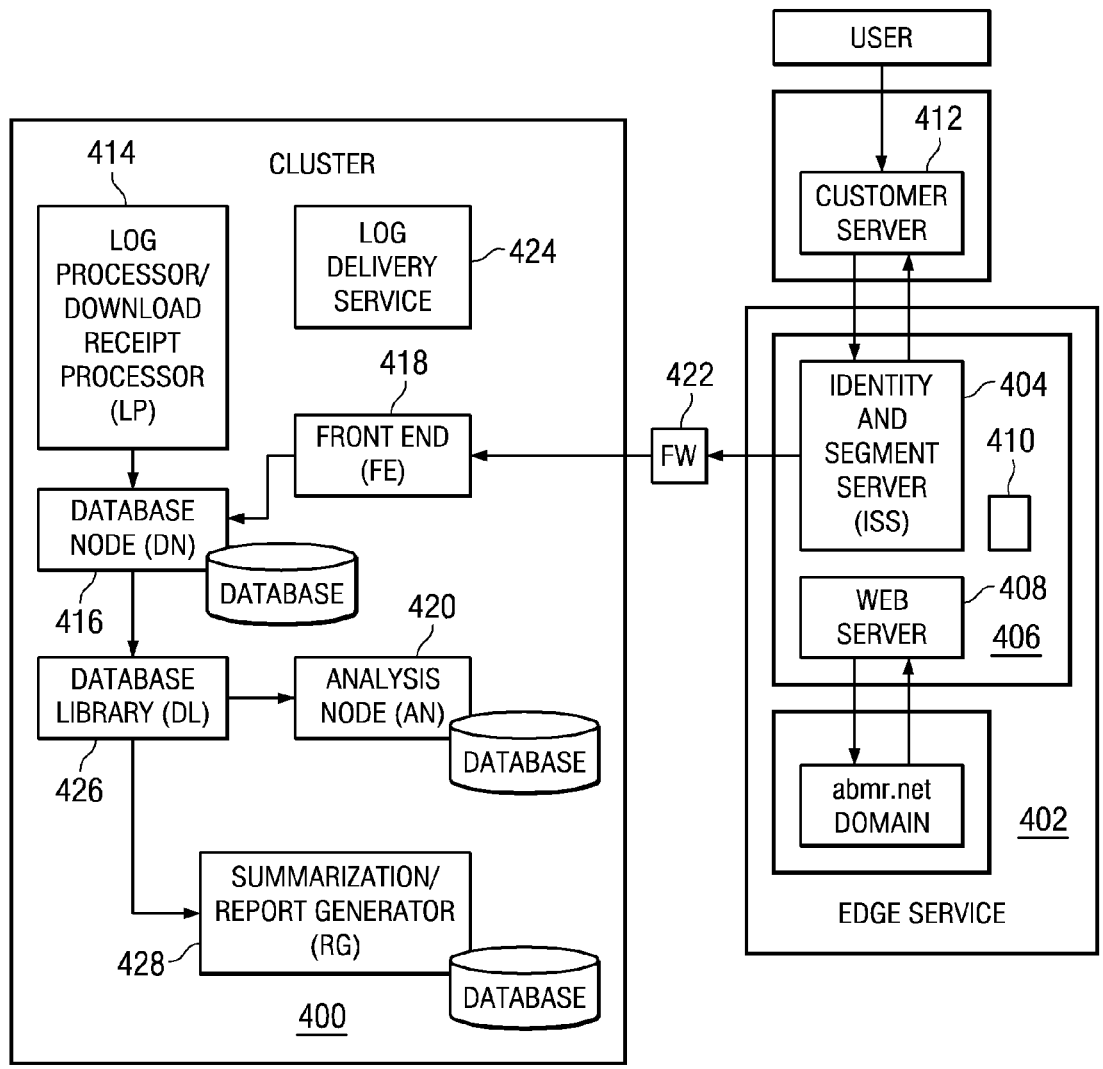
FIG. 4 is a more detailed block diagram of an embodiment of the online behavior data collection system.

FIG. 4 illustrates an implementation of the above-described subject matter. The system comprises two major operational portions, a data cluster 400, and an edge service 402. Only one edge service instance is shown; of course, this service operates on all or some significant portion of the CDN edge servers. (As used herein, "edge" server is not intended to imply any particular CDN configuration or architecture). The edge service is used to capture the online behavior data, which is then provided to and processed by the data cluster 400. Generally, the cluster is a collection of machines that digest edge server machine access log data. It accepts access log data as input and produces so-called "identity" and "segment" data as output, as will be described. The cluster also provides a point at which the content delivery network service provider, its customers, and its partners, may explore the system's corpus of data, produce (e.g., manually, or in an automated manner) reports, and develop new and/or refine segment definitions. As will be described in more detail below, to facilitate high performance, the cluster preferably is organized into three principal stages: data acquisition, data processing and storage, and data retrieval. The data acquisition stage is implemented on a Log Processor/Download Receipt Processor (LP) 414. The data processing and storage stage is implemented on a Database Node (DN) 416. The data retrieval stage is implemented on a Front End (FE) 418. An analysis node AN 420 typically functions in an "off-line" manner. AN 420 provides an SQL-enabled web interface for performing off-line analysis on larger subsets of the aggregate system data set.

The data cluster components will be described in more detail below.

Edge Service

There are preferably two types of operations that occur in the edge service, identity and segment operations. These services are implemented by an Identity & Segment Server 404 shown in FIG. 4. The edge machine 406 on which ISS executes includes the HTTP Web proxy 408 and its associated server manager (ghost) process 410, as previously described. A CDN customer that desires to use the described system operates an origin server 412 and will enable identity operations for their site(s). Once this is accomplished, the customer may also enable segment operations. Preferably, both implementations are configured through metadata that is provided to the edge server manager process, as previously described. As seen in FIG. 4, the ISS server 404 interacts with a given cluster front end FE instance 418 through a firewall 422, although this is not required.

Although not meant to be limiting, ISS may be implemented as a C program designed to run as a multi-threaded FastCGI process listening for requests from a local web server. Machines that run ISS typically also run the edge server manager process. Although the functionality described below is implemented in two separate processes (ISS and ghost), this ISS functionality may be native to the edge server manager process.

Broadly, identity and segment operations are triggered on various user requests, using either the requested object, or some feature of the HTTP request (e.g. HTTP header or cookie value). On requests that trigger identity operations, the edge server manager process responds with a redirect (HTTP response code 302) into a third-party domain controlled by the CDNSP (abmr.net). This is the domain in which the system sets the canonical Master ID (AKID) cookie. The request to the abmr.net domain will itself result in a redirect back to the original customer domain, for the originally requested object. Typically, the only addition to this redirect is that the value of the AKID in abmr.net is embedded in the request as a variable/value pair query string. The edge server manager process will then set a customer domain-specific cookie, the value of which will be the same as the AKID in abmr.net. Segment operations are less complex, in that the user only makes a single request. In this operation, the request results in the edge server manager process issuing a forward request to fetch the segment information of the user. The response to this request is itself a redirect, for which customer metadata is then configured to chase. Preferably, the redirect is a specially-constructed request from which another edge server manager process can extract the segment information from the request and include it as a header in the final HTTP request to the customer origin server.

Identity Operations

To enable identity operations, suitable objects on relevant pages are selected to serve as "trigger" and/or "execute" objects. Although not meant to be limiting, good candidate pages are those "landing" pages that most typical users first access on a typical visit to the site. Although not meant to be limiting, good candidate objects are those objects that appear on the majority of landing pages and/or on most pages throughout the given property. "Trigger" objects are not required but are used to guard against situations where end-user browsers never accept any cookies. They enable the system to perform a check for the existence of some known cookie in the customer domain. If the customer property has one or more cookies set (either session or permanent cookies), then the trigger objects may not be necessary. When trigger objects are used, edge server manager process metadata checks if a request for the trigger object contains a known cookie/value pair. If the request does not, then the manager process sets the appropriate cookie to the appropriate value. "Execute" objects are used to force the server manager process to redirect end-users into the abmr.net domain. Typically, this redirect is only forced when (1) the user has presented the appropriate cookies (either the one set on a request for a "trigger" object, or one already set in the customer domain), and (2) the "execute" object is requested.

Figure 5:
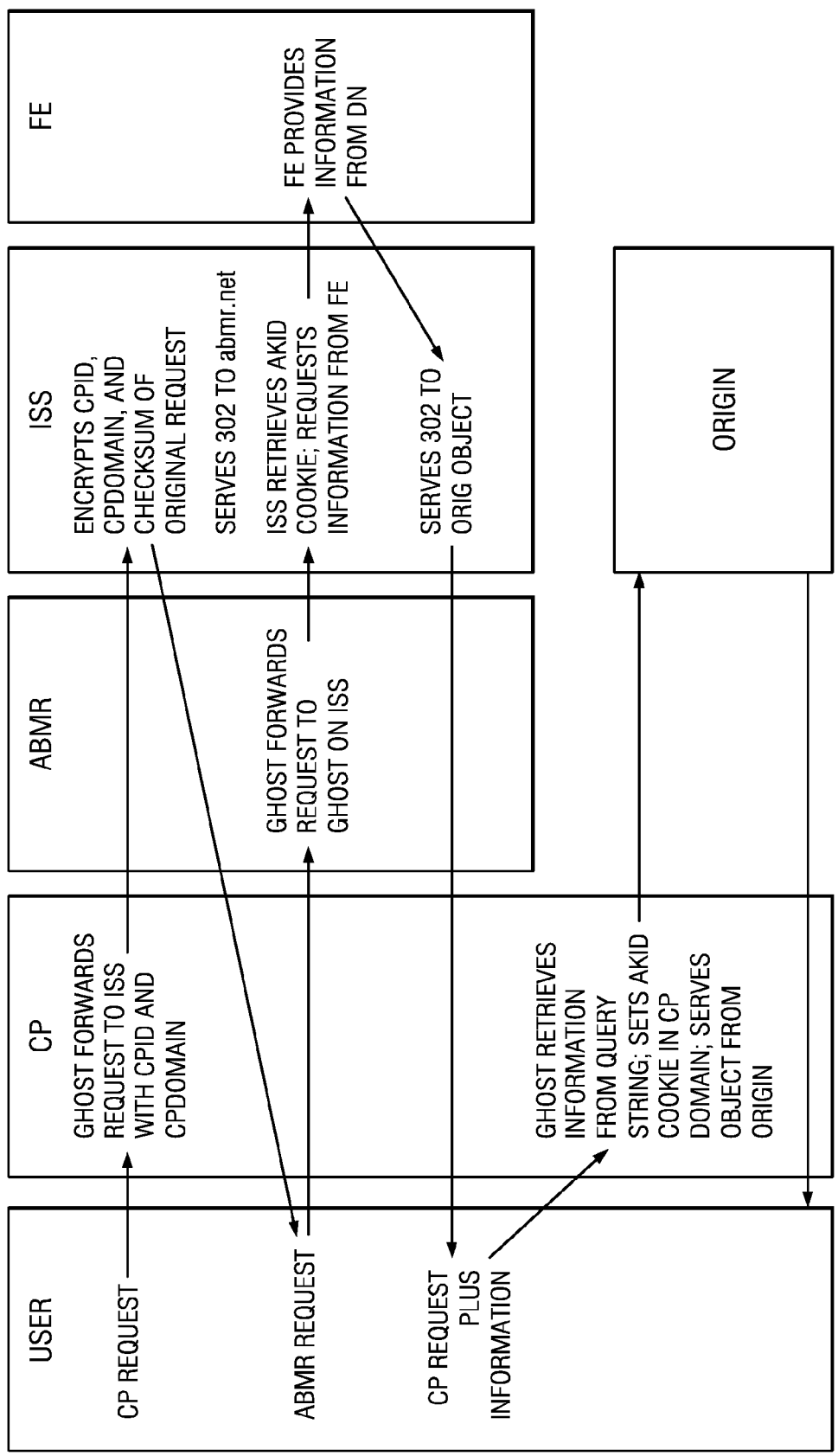
FIG. 5 illustrates a process flow associated with an identity operation initiated at an edge server.

FIG. 5 shows the request flow for a request for an execute object that includes the requisite cookies (and values). The blocks marked CP and ABMR are edge server process manager (g-host) operations, but the blocks refer to the respective domains. In this operation, the edge server manager process issues a forward request to an ISS machine (the IP of which may be determined by a DNS lookup of a name managed by the CDN) which forms the actual redirect location. This redirect location points the user to the abmr.net domain; it includes in the query string an encrypted string that contains: a fingerprint of the originally requested document or object, the identifier for the user in the customer domain (if any), and the name of the customer domain. This last field, the customer domain, may be different from the name of the property, for instance, the CDN may separately enable "www.example.com" and "my.example.com," in which case the customer domain is example.com. As seen in FIG. 5, the edge server manager process receives the response from ISS and relays this response to the end-user.

The end-user receives the HTTP 302 redirect and follows this request to the abmr.net domain. This request includes the user's current AKID cookie value, if any. Server process (g-host) metadata for the abmr.net domain then forward the request on to an ISS machine (again, determining the IP address through a DNS resolution on a CDN-managed name). The ISS machine takes one of the following actions:

Reset the AKID. If the user presents a customer-provided identifier, then ISS attempts to retrieve the AKID for the (CPID, CPDOMAIN) pair for this user. If the cluster has an AKID for this user, and the user has either no/an invalid AKID, or a valid AKID that is newer than the one in the data cluster, ISS will re-set the user's AKID to the one retrieved from the data cluster. Otherwise, ISS will fall to the next case.

Reissue the same AKID. If the user presents a valid AKID, then ISS re-issues the same AKID. Otherwise, ISS will fall to the next case.

Create a new AKID. This is a default action.

Preferably, ISS sends a "Set-Cookie" header to set the value of the AKID cookie, with an expiration of "Never Expire." ISS also generates a redirect location that is preferably identical to the original user request except that it contains a special query string argument, the value of which is the same as the AKID value ISS just set. Once the user follows this second redirect, the edge server manager process executes a final mode of customer metadata designed for identity operations. This metadata path extracts the AKID value from the query string and sets the customer-specific AKID cookie with this value. It also terminates this extended user-request flow by serving the requested object.

Segment Operations

Figure 6:
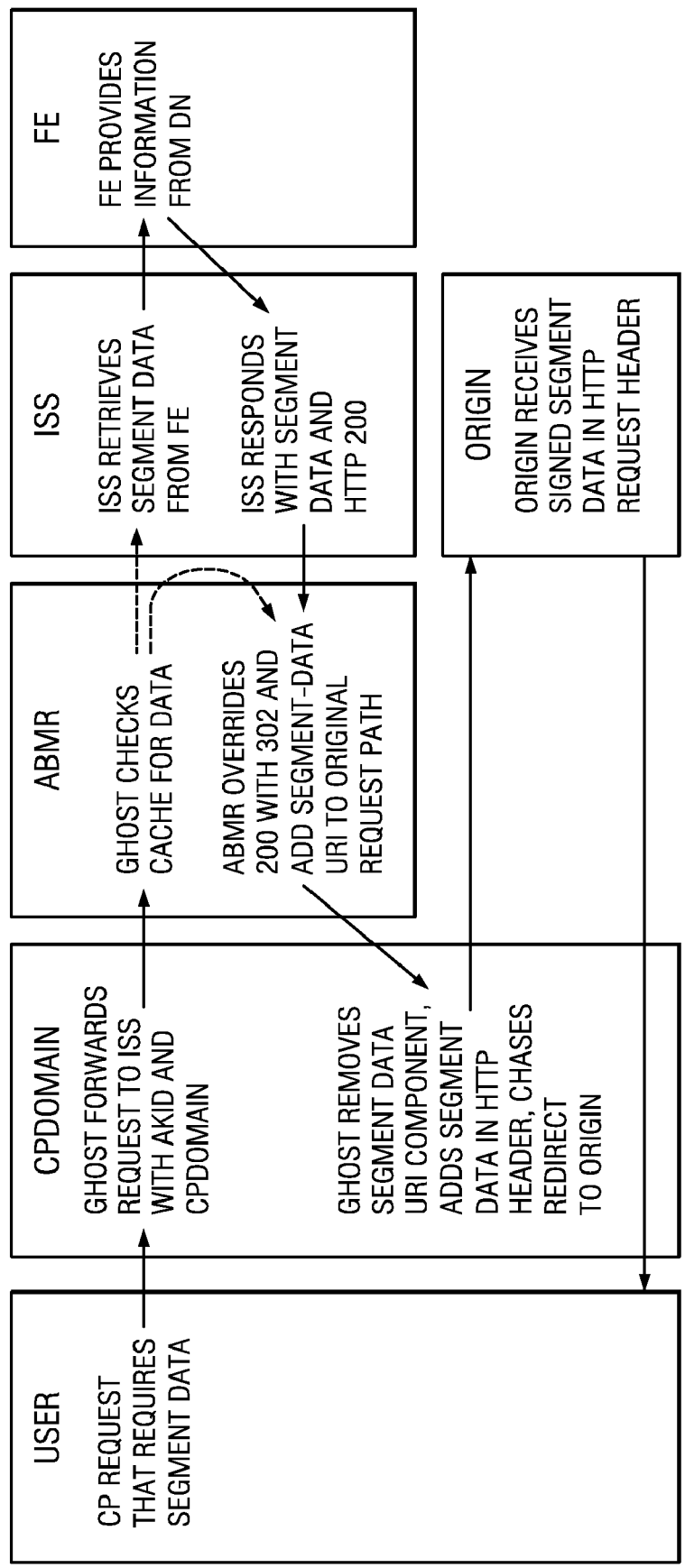
FIG. 6 illustrates a process flow associated with a segment operation.

To enable segment operations, the requests to the origin for which the customer requires segment information must first be determined. For instance, for a "bot mitigation" customer, interesting requests may be those for a first secure page in a checkout click-stream. For a customer that is interested in using the behavioral data for other purposes (e.g., targeting ads), all requests may require segment information. The only other piece of information required to enable segment operations is that the customer and the CDN service provider must agree on an encoded string to act as the shared secret key for the message digest signature that will accompany all segments sent to the origin server. The request flow is shown in FIG. 6.

On any appropriate request, the segment metadata first checks for the existence of the AKID cookie in the customer request. If a value is not present, or if it does not match some basic validity tests, then the edge server manager process finishes the request by serving the requested object. If the value presented looks valid, however, then metadata extracts various pieces of information from the request, e.g.: origin host: hostname of the customer's origin server for this request, request host: hostname/property of the original request, request object: path/filename of the original request, query string: query string of the original request, AKID: value of the AKID presented in the original request, and customer domain: name of the customer domain of the original request. The edge server manager process then issues a forward request to the abmr.net domain with the information above included in HTTP headers in the request. The edge server manager process keeps these HTTP headers for every forward request it makes for this particular end-user request. The cache key for this request preferably includes the customer domain and the value of the AKID.

This "segment fetch" request to abmr.net may result in a cache hit. In the case of a cache miss, then the edge server manager process issues a forward request to an ISS machine. ISS will retrieve the value of the AKID and turns around and fetches the segment information for this AKID from the centralized data cluster. ISS then parses the response to provide only those segments provisioned for the given customer domain. Finally, ISS signs the segment response (e.g., a URL-encoded string of the form "segment_1=value segment_2=value"). The response ISS generates for the manager process (in the abmr.net domain) typically is an empty body, with an HTTP header that contains a signed and provisioned segment string:
(i.e., "segment_1%3Dvalue%20segment_2%3Dvalue%20, <signature>"),
and an HTTP response code (e.g., 200 OK). Once the edge server manager process receives this response (either directly from the forward request to ISS, or from cache in the event of a cache hit), metadata for the abmr.net domain rewrites the response code to a temporary redirect (HTTP response code 302). Metadata is used to construct a redirect location using the request host, request object, and data from the segment header from the response from ISS. Customer metadata receives this 302 and is instructed to chase the redirect. The edge server manager process performs a DNS resolution of the hostname "isdata.abmr.net," which resolves to some other g-host process. The manager process issues the request, which is handled, again, by the abmr.net metadata. Conveniently, the HTTP headers sent with the original request to abmr.net (i.e., the request to fetch the segment information) are also available on this second request to abmr.net. The abmr.net metadata designed to deal with this request uses the contents of these headers to recreate the original request. First, it extracts the value assigned to the path parameter "SEG". It includes this value as a special HTTP request header ("X-IS-Server-Seg-Data"). Then, it recreates the original request. Finally, it issues this request to the origin server (as provided in the request host HTTP request header from the customer domain), which now includes the HTTP request header:
"X-IS-Server-Seg-Data: segment_1%3Dvalue%20,<signature>".
The segment operation concludes by the edge server manager process serving the response from the origin server to the end user.

Data Cluster

As noted above, the cluster preferably is organized into the following stages: data acquisition, data processing and storage, and data retrieval. Preferably, each stage is parallelized and may be scaled as load requires. Each stage is now described.

Data Acquisition

There are several possible methods by which the cluster acquires data. Access logs (provided by edge servers to a CDN Log Delivery Service (LDS) 424) are the cluster's primary data source. As noted above, access logs are processed on machines called Log Processors (LP) 414. The Log Delivery Service (LDS) delivers logs to LPs via any convenient mechanism, such as FTP, e-mail, or the like. A first process (i-ftpd) operative in an LP machine accepts these log files, and when LDS completes its FTP PUT operation, the first process moves the completed file in to a directory where a second process (i-lp) operative in the LP machine may find it. When the second process finds a file that is ready to be processed, the second process opens the file, uncompresses it if necessary, and proceeds to parse it. For each log line it parses, the second process preferably identifies the following fields: the requested URL, the referer, the time of the request, the source IP address, and the value of AKID and CPID cookies, if they were specified in the request. The second process then maps those fields to one or more "behaviors." Preferably, this is done with a behavior map, which is a configuration that, for each content provider (CP) code, specifies a mapping of (URL, referer) regular expression pairs to one or more behaviors. For each behavior identified, preferably the second process emits a behavior operation to a Database Node (DN) to record the occurrence of the event. If a CPID cookie was specified, the LP additionally emits an identity operation. These operations are described in more detailed below. A behavior operation specifies an event's behavior name (its "behavior_id"), time, AKID, and source IP address. An identity operation specifies an AKID, CPID, and CPDOMAIN. Preferably, the second process has an internal cache through which it aggregates these operations, preferably in an LRU-managed data structure. In this model, multiple operations/events for a given AKID/behavior pair may be aggregated into a single operation, with operations emitted to DNs per a given cache eviction policy. This significantly reduces DN workload and reduces LP/DN network performance requirements.

Preferably, the system also supports an online model of data acquisition via download receipt processing. In particular, the edge server manager process may be configured to post download receipts to Download Receipt Processors (DRPs) for certain objects or content provider codes. The requested URL, referer, access time, source IP address, and AKID and CPID cookie values are provided in the receipt. DRPs may map these receipts/requests to behaviors.

Data Processing and Storage

As noted above, the system processes and stores acquired data on machines called DNs 416, using a process (i-dn).

For purposes of scalability, the system preferably partitions its corpus data into partitions, each of which is identified by a serial number. Each serial number is uniquely assigned to a DN, and DNs are often assigned several serial numbers. The third process preferably maintains two principal tables: a behavior table, which records behavior data, and an identity table, which records identity data. The behavior table stores information in a behavior record, which records behavior data (event data) over time for a particular (AKID, behavior_id). Behavior data preferably is compressed by slotting events into a number of contiguous intervals. The identity table records an association between (CPID, CPDOMAIN) pairs and AKIDs. This information is used to re-establish a user's identity if the user has deleted his or her cookies. As used herein, a segment typically is a composite "score" based on historical data for a given user. The primary inputs to any given segment are the behavior records for the user. Additionally, scores from other segments for a given user may also influence a user's score in a certain segment. For a given user, and for a given segment, the system preferably stores a most recent score, a last time at which that score was updated, and a notion of the confidence of that score. To maintain segment information, the DN process maintains a segment table that, like the behavior and identity table, is partitioned. In particular, preferably behavior and segment data are partitioned on a hash of the AKID into a serial number. Identity data are partitioned on a hash of the (CPID, CPDOMAIN) pair into a serial number. The DN behavior, identity and segment tables constitute separate DN services, each of which preferably has its own serial number space. If desired, each service can be run on its own set of DNs. Each serial number of each table preferably is stored in its own database image.

Data Processing

The DNs 416 support several main operations: behavior record update ("behavior operation"), identity record update ("identity operation"), segment query, and identity query. Another operation, the segment record update ("segment operation") can occur asynchronously from any other operation. These operations are now described.

Upon receiving a behavior operation, the i-dn process fetches the record associated with the operation, creating it if it does not exist. After certain processing, the i-dn process then writes the record back to the database. The process then invokes a library called i-sn to update the AKID's segment data.

Upon receiving an identity operation, the i-dn process fetches the record associated with the operation, creating it if it does not exist. This record merely records an association, and no further processing is required. The DN is linked with the library, i-sn, that provides segment update and segment query support. This operation results in updates of the relevant segments for the given AKID in the segment tables, according to the rules established in a configuration file for the i-sn library.

Upon receiving an identity query, the i-dn process fetches the record of the requested (CPID, CPDOMAIN) pair, and it then provides the corresponding AKID to the client. Upon receiving a segment query, the process i-dn invokes the i-sn library to fetch a segment string for the requested AKID, and it then provides that segment string to the client.

Data Retrieval

The cluster's Front Ends (FEs) 418 provide an HTTP interface to the cluster. The CDN may have one or more external networks that use this interface to fetch data from the cluster. The FEs obviate querying clients to know where data is hosted in the cluster (which DNs are assigned which serial numbers), and they also act as a load buffer to protect the cluster from high query (high network) load. Upon receiving an identity or segment request from an edge service ISS component (as will be described), an FE determines which DN to query for the information, issues a query operation to that DN, reads a response, encrypts the response, and relays the encrypted data back to the ISS client.

As also seen in FIG. 4, a Data Library (DL) node 426 is provided for long term storage, and a Report Generator node 428 is used to facilitate generation of reports on the collected data. The Report Generator typically operates in conjunction with the AN. A CDN customer accesses these systems in the usual manner, e.g., over a secure communication link. In one embodiment, the collected information is made available via an extranet portal, via a Web service, or in any other convenient manner.

The CDN service provider charges for use of the data system in any convenient manner, e.g., on a use basis, per user agent VUS, on a subscription basis, by Master ID tracked, by page/object view, by user profile, by segment, or the like.

The system described herein thus has several primary components:

(a) ID Management—used to track client machine user agents between sites and stamp their click stream in the relevant logs. This component comprises metadata in the customer's domain, as well as the edge service functionality to create (and "reset") IDs, as described above. While the above-described system relies on cookies for persisting the ID in the user agent cookie store, this is not a requirement, as other passive schemes have been described.

(b) Data Collection and Processing—responsible for processing logs and building the user profiles. This operation is done is real- or near real-time by getting logs delivered from the CDN log delivery service (or other source) and processing each log line, which processing maps the URL pattern to a behavior. For example, a line with " . . . cp.com/.* would increment an "cp_user" behavior for that user agent.

(c) Off-line Data Analysis—data from the online system is gathered into an off-line system, where it can be processed for other users. One use is to provide an SQL interface to the data via the AN. Another use is to produce reports for a CDN customer portal.

(d) Real-time Profile Retrieval—when configured to do so, servers at the edge retrieve the user profile from the data cluster and then include this information in the forward request to the customer origin. This is the method customers use to take action on the behavior data.

The data system can be used for many different types of services.

A first use case is a "publisher" service. In this example, a given CDN customer that operates a set of domains or properties (using the CDN) may use the system to obtain information about the user agents that operate across that set of domains. Such information may then be used by the customer (or others) for other purposes (e.g., ad serving, dynamic content generation, or the like). As a specific example, the CDN customer may operate two sites, A and B, and the CDN service provider tracks user agent data across the sites. By analyzing the data, the CDN service provider may determine that 10% of Site A user agents also visit Site B, but that only 3% of Site B user agents visit Site A. As another example, the system may be used to provide information about the number of requests that a specific audience is responsible for (e.g., 3% of users are responsible for 10% of all requests to a site). In this manner, the CDN customer can obtain much more useful data about the demographics of the user agents and, thus, presumably the actual users who view these sites.

A second use case is a "bot mitigation" service. In this example, a given CDN customer that operates a transactional site (e.g., a web site at which end users purchase limited inventory items, such as event tickets, hotel rooms, airline seats, and the like) may use the system to obtain information about the user agents that access the site and, in particular, whether a particular user agent is likely to be an automated entity (e.g., a software robot or "bot"). The site can use this information to offer the best level of service to those user agents most likely to be valid (i.e., human). This operation facilitates mitigation of bot and other site frauds. The bot mitigation functionality may also be used for other types of sites (e.g., friend-based social networking sites) where bots are also prevalent.

A third use case is a "partner" service. In this example, the CDN service provider uses the data system to provide federated services on behalf of two or more entities that use the CDN. As an example, Customer A manufactures a line of products and has a web site describing its products; Customer B is a web site that provides information services about new and used products, such as the products A manufactures. Customers A and B have (or may benefit from) a business relationship under which they share information about the end users who visit their respective web sites. In this example, if both Customer A and Customer B use the CDN to deliver their sites, the data system herein may be used by one or both customers to facilitate and extend such data sharing, as the CDN can use the data system to collect the behavior information of user agents who visit both sites. As another example, Customer A may be a social networking site, and Customer B offers a given product or service that it desires to promote on Customer A's site. If both Customer A and B use the CDN to deliver their sites, the data system herein may be used by Customer A to identify if a given user agent visiting its site has been to Customer B's site. This information can then be shared to facilitate a given activity (e.g., serving a given advertisement, providing a given cross-promotional benefit, or the like).

Another use case is a "targeting" service. In this example, the CDN service provider uses the data system to facilitate targeting of advertisements, e.g., by generating a user profile of a user agent and providing that profile to an ad serving engine. The system preferably executes or interfaces to segment scoring business logic to establish interest scores for each "active" segment for each AKID. Behavior data for a given AKID may be mapped into segments as follows. For each behavior ID associated with an AKID, take a most recent epoch for which there exist events for that behavior ID. Determine the age of those events, e.g., by subtracting a current time from the midpoint of the epoch in which those events occurred. Multiply the number of events in that epoch by a function of the epoch's age to decay their value. The "intensity" of that segment/behavior for that AKID is then the result of that multiplication. Ad selection logic may then sort the segments to find the one with the greatest intensity and select an ad from that segment.

Another use case is where the CDN service provider runs the system on behalf of a customer that provides a search engine (or the like). The customer's infrastructure includes or is associated with a bidding mechanism by which third parties can bid on inventory (e.g., ads, keywords, paid text, and the like) that may be returned by the customer's search engine in response to a user agent query. When the query comes into the search engine, the inventive data system is accessed so that whatever data or profile the CDNSP has about the user agent can be provided as an input to the bidding algorithm. The particular manner in which the customer accesses the data system may be varied. For example, the data system may have a module that executes in the content provider's infrastructure, of the information may be passed out-of-band. In either case, the customer's bidding mechanism (or algorithm) is provided with additional information (e.g., the user profile, the VUS, or other such data) so that the third parties can bid more effectively on the inventory.

Outputs

In one embodiment, the output of the data collection system is a series of name/value pairs associated with a given Master ID. These name-value pairs may be in the form of values representing guesses (e.g., Male=0.9 means likely male, Male=0.5 means no guess, Male=0.1 means likely female) and/or generic labels perhaps with confidence scores (e.g., Interest=Olympics, confidence=75%). Each of these may be a "segment."

As such, preferably the profile is defined by a given ontology; it may conform to a given data schema. A representative list of potential attributes is as follows:

General Interests: (e.g., relative interest values across multiple levels of a hierarchy)
    Sports—Baseball, football, NASCAR, soccer, hockey, basketball; pro/college within as relevant; teams
    News—International, National, Regional
    Finance
    Entertainment—Movies, particular people
Current Shopping Interests:
    Auto
    Home appliance
    Travel
Demographic Information:
    Age
    Gender
    Income Level
    Location of home (e.g., ZIP code granularity)
Internet Behaviors
    Amount of time spent online per day
    Degree of Internet purchasing done A representative user profile is shown at FIG. 7. This data herein is merely representative. It should be appreciated that the user profile does not include any personally-identifiable information (PII).

The above-described infrastructure may include one or more variants. Thus, it may be desired to extend the functionality to provide more detailed information filtering or processing. As referenced above, the system may include user clustering or correlating functions to track user agents across devices. Thus, if a given content provider or ad serving entity puts user ids into files served by the CDN, the CDN server provider architecture as described above preferably includes the capability to process the information and determine that two different cookie IDs (or other identifiers) represent the same person or entity that is accessing the given site (off-loaded to the CDN, in whole or in part) from two different locations (e.g., home versus work) or, more generally, with two different devices. The system includes appropriate functionality (e.g., correlation algorithms, clustering algorithms, or the like) to enable the service provider to filter out duplicate information.

As noted, the CDN service provider (by virtue of its service) has access to a large amount of data that is collected as end users browse to sites that have been off-loaded (in whole or in part) to the CDN. Many of these end users, however, will not be associated with a unique IP address because their particular client machine is located behind a firewall. Thus, the present invention may be extended by having the service provider (a) monitor given request data streams (e.g. the requests originating behind an enterprise firewall) and (b) execute clustering algorithms against the resulting data in an attempt to extract useful information, e.g., how many unique IDs are associated with the data, whether a given cluster corresponds to a given set or subset of users, or the like. Representative clustering algorithms include, without limitation, k-means, SVM (using forward-fitting or mutual information as the feature selection algorithm), or the like. More generally, clustering algorithms are useful to extract other information about given users who have been identified according to the general techniques previously described.

As noted above, the data collection techniques according to the present invention may also provide information useful in characterizing whether a particular user agent associated with a Master ID is a human being, as opposed to an automated machine, program or process. Thus, for example, if the "entity" associated with the Master ID spent a given number of hours online, visited sites X, Y and Z, and purchased an item on site Y, then it is likely that this entity is not an automated process (e.g., a ticket bot that has a dedicated task of purchasing concert tickets for resale from a given web site). Likewise, if the user agent visited a "catalog" page (versus, say, a "purchase" page), that the user agent is more likely associated with a human user, as a bot would not be expected to spend time viewing a page intended to be read. Appropriate software routines can be implemented for providing this and other types of entity discrimination (e.g., determining whether an entity is attempting a click fraud, a "Sybil" attack, or the like). In one embodiment, a set of one or more factors are evaluated to determine whether a user agent is a ticket bot. These factors include, for example,: diversity of CDN domains visited by the client machine user agent, a purchase-to-catalog page ratio with respect to one or more pages associated with a given content provider domain, an amount of time that has passed from a last browsing session, an amount of time that the client machine user agent has been online during a current browsing session, and a number of IP addresses the client machine user agent has been associated with in a given time period. These factors are merely representative. Typically, it will be desirable to monitor a user agent across multiple sites or domains so that a determination of "normal" (human-like) behavior can be made across many sites, and perhaps over a given time period. Of course, with more data, the system can obtain more confidence that the user agent is associated with a valid user.

In particular, and based on the factors, the system provides an indication of its confidence that the user agent is associated with a human user. The indication typically is in the form of a valid user score (VUS). The higher the VUS, the more likely the user agent is associated with a human user. (Of course, the term "higher" is relative; a "lowest" value may represent a better score). In one embodiment, a VUS is calculated as follows. There are a set of data sources (the one or more factors described above) from a network layer up through an application layer. The system analyzes the determined attributes to extract out indicators of normal human behavior. What is indicative of "normal human behavior" may vary by site, or even within different areas of a site. By combining one or more attributes using a weighted algorithm, a Valid User Score (VUS) is generated to represent the service provider's confidence that this user agent is associated with a normal human user. The particular algorithm weights used will depend on the factors, the type of site, the nature of activity that is deemed to be normal, and the like.

If a bot has been flagged, a mitigation action is taken. The particular action can be quite varied. A mitigation action may include, for example, serving given dummy or alternative content to the client machine user agent, providing the client machine user agent with a lower quality of service, routing the client machine user agent to a subset of servers in the CDN at which it is forced to compete for resources with other client machine user agents that have been characterized (by the VUS scores) as bots, and the like. The degree to which the client machine user agent's quality of service is lowered may be a function of the VUS; thus, for example, a response time may be adjusted by a multiple of the VUS. In contrast, if a particular VUS associated with a client machine user agent is associated with what the system believes is a human user, that client machine user agent may receive preferred content, receive a higher quality of service, be routed to a high-performance set of servers, or the like.

It should be appreciated that the bot analysis function described above focuses on determining whether a user agent is associated with a "human" user, as opposed to trying to determine whether a given user agent signature is or is not a bot. This approach, which has a goal of identifying valid users, is highly advantageous, as bot developers can easily change a bot signature (once the bot it identified) to mask its identity. The technique described herein is based on the premise that the system gives a user agent credit for interacting with a given site in a manner that looks normal (from the point of view of a human user), but typically the VUS will depend on the user agent being found to have exhibited such "normal" human behavior across multiple CDN-supported sites (or domains), perhaps over some time period or according to some other criteria that tends to show such normal behavior. Thus, if a user agent looks "normal" (i.e., human) on one site, that does not mean that the user agent is associated with a high VUS; rather, that user agent must be found to look "normal" across multiple sites/domains, perhaps over some given time period. Thus, as the user agent interacts with more and more sites/domains, the system may be expected to increase its "confidence" that the user agent really is associated with a human user. In making this determination, what is or is not "normal" (human) behavior may differ across sites/domains, so that for site A one set of actions is normal, while at site B another set of actions is normal.

The "bot" mitigation function may be used for other types of sites. Thus, for example, "friend-based" social networking sites are often infected with "friend-bots," which are automated entities that attempt to request friendship with legitimate users. The bot analysis and mitigation techniques described above are also useful in this scenario. Here, the bot analysis looks for certain factors that are indicative of a friend-bot, e.g., a user agent that does little else but visit (legitimate) user profiles, scrape user IDs or other information from those profiles, and then adds the users to the user agent's "friends." Such "friend-addition" actions are likely to be associated with friend bots. Thus, the CDN service provider may provide the social networking site customer a VUS (or some equivalent data) that reflects the service provider's confidence that a particular user agent is a "friend-bot" or some other undesirable automated entity (e.g., a messaging bot).

The above examples illustrate that the particular bot-revealing activity for a CDN customer site will depend on how the user agents are intended to interact with the site. However this is accomplished, the data system described herein may be used to provide an associated bot mitigation.

The data system as described herein also may be used simply to flag a given user agent as suspicious. Data collected on user agents on one site can be used for analysis and prediction of their behaviors on other sites. Thus, in the ticket bot example (which is not meant to be limiting), a ticket bot may be identified by its VUS at ticket site A. Independently, it may be determined that there is a strong correlation between highly active users of site A and highly active users of other ticket sites. In this case, the system builds a list of such users of site A and then uses that list for bot prediction on another ticket site.

The data system may also be used to identify and mitigate other types of online site frauds, such as click fraud, search engine fraud, and the like.

As also noted, the CDN service provider may also provide federated services on behalf of one or more of the entities (e.g., content providers, ad serving entities, or the like) that have been previously described.

Having described our invention, what we now claim follows below:

1. Apparatus for use in a content delivery network (CDN) in which participating content providers offload given content for delivery from content servers managed by a content delivery network service provider, comprising:
   a processor;
   a computer memory holding computer program instructions that when executed by the processor perform a method comprising:
   tracking a client machine user agent across a plurality of content provider domains being managed by the content delivery network service provider, wherein the client machine user agent is an atomically identifiable web client, the tracking including the following sub-steps carried out with respect to at least one content provider domain visited by the client machine user agent:
      redirecting the client machine user agent from the content provider domain to a content delivery network service provider namespace and setting a master cookie,
      automatically redirecting the client machine user agent back to the content provider domain from which the client machine user agent was redirected; and
      setting a content provider domain-specific cookie equal to the value of the master cookie; and
   with permission of a first participating content provider, providing a second participating content provider with information obtained during the tracking step,
   wherein the information tracks the client machine user agent across one or more content domains associated with the first participating content provider and includes an indication that the client machine user agent has visited the one or more content domains.

2. The apparatus as described in claim 1 wherein the information is a profile associated with the client machine user agent.

3. The apparatus as described in claim 2 wherein the profile comprises one or more segments, wherein a segment is a classification of a behavior of the client machine user agent at a content domain associated with the first participating content provider.

4. The apparatus as described in claim 3 wherein a segment comprises a set of one or more behaviors.

5. The apparatus as described in claim 1 wherein the profile is created by filtering out any personally identifiable information that is obtained during the tracking step.

6. The apparatus as described in claim 1 wherein the tracking step is accomplished passively by collecting and correlating cookie data.

7. The apparatus as described in claim 1 wherein the first and second participating content providers have a business agreement with one another by which the first and second participating content providers share information.

8. The apparatus as described in claim 7 wherein the second participating content provider uses the profile to provide information targeted to an end user associated with the client machine user agent.

9. The apparatus as described in claim 1 wherein the information is provided to the second participating content provider for a fee.

\* \* \* \* \*